United States Patent
Oden et al.

(10) Patent No.: US 6,292,554 B1
(45) Date of Patent: Sep. 18, 2001

(54) SYSTEM AND METHOD FOR COMMUNICATING WITH AND CONTROLLING DISPARATE TELECOMMUNICATIONS DEVICES IN A TELECOMMUNICATIONS NETWORK

(75) Inventors: Gene Oden, Cedar Park; Trevor Baca, Austin, both of TX (US)

(73) Assignee: Simplified Telesys, Austin, TX (US)

( * ) Notice: Subject to any disclaimer, the term of this patent is extended or adjusted under 35 U.S.C. 154(b) by 0 days.

(21) Appl. No.: 09/414,668

(22) Filed: Oct. 7, 1999

(51) Int. Cl.$^7$ ............................. H04M 7/00; H04J 3/16
(52) U.S. Cl. .................. 379/229; 379/219; 379/220; 370/466; 370/467
(58) Field of Search .................. 379/88.13, 88.14, 379/229, 220, 242, 219, 227, 228, 230; 370/466, 465, 467, 352

(56) References Cited

U.S. PATENT DOCUMENTS

| | | | |
|---|---|---|---|
| 5,182,748 | * | 1/1993 | Sakata et al. ........................ 370/466 |
| 5,420,916 | * | 5/1995 | Sekiguchi ............................. 379/230 |
| 5,497,373 | * | 3/1996 | Hulen et al. ......................... 370/259 |
| 5,530,434 | * | 6/1996 | Kanda ............................. 340/825.04 |
| 5,689,533 | * | 11/1997 | Ahuja et al. ......................... 379/202 |
| 5,793,771 | * | 8/1998 | Darland et al. ..................... 370/467 |
| 5,838,768 | * | 11/1998 | Sumar et al. ....................... 379/88.14 |
| 5,987,100 | * | 11/1999 | Fortman et al. ................... 379/88.14 |
| 6,064,723 | * | 5/2000 | Cohn et al. ........................ 379/88.14 |
| 6,111,893 | * | 8/2000 | Volftsun et al. ..................... 370/466 |
| 6,122,290 | * | 9/2000 | Kawamata ........................... 370/466 |
| 6,151,390 | * | 11/2000 | Volftsun et al. ..................... 379/229 |

* cited by examiner

*Primary Examiner*—Fan Tsang
*Assistant Examiner*—Ovidio Escalante
(74) *Attorney, Agent, or Firm*—Erik B. Cherdak & Associates, LLC

(57) ABSTRACT

System and method for communicating with and controlling disparate telecommunications devices in a telecommunications network. The system and method include and involve a first telecommunications device configured to communicate within a telecommunications network according to a first messaging format, a second telecommunications device configured to communicate within the telecommunications network according to a second messaging format, and an interfacing facility. The interfacing facility communicates with the first and second telecommunications devices via the telecommunications network. The interfacing facility also is configured to detect and receive a first external message formatted in accordance with the first messaging format from the first telecommunications device, to extract data from the first external message, to generate an internal message based on the data extracted from the first external message, to generate a second external message based on the internal message and the second messaging format, and to send the second external message to the second telecommunications device. The second telecommunications device is configured to operate (e.g., be controlled by, etc.) in accordance with the second external message.

6 Claims, 10 Drawing Sheets

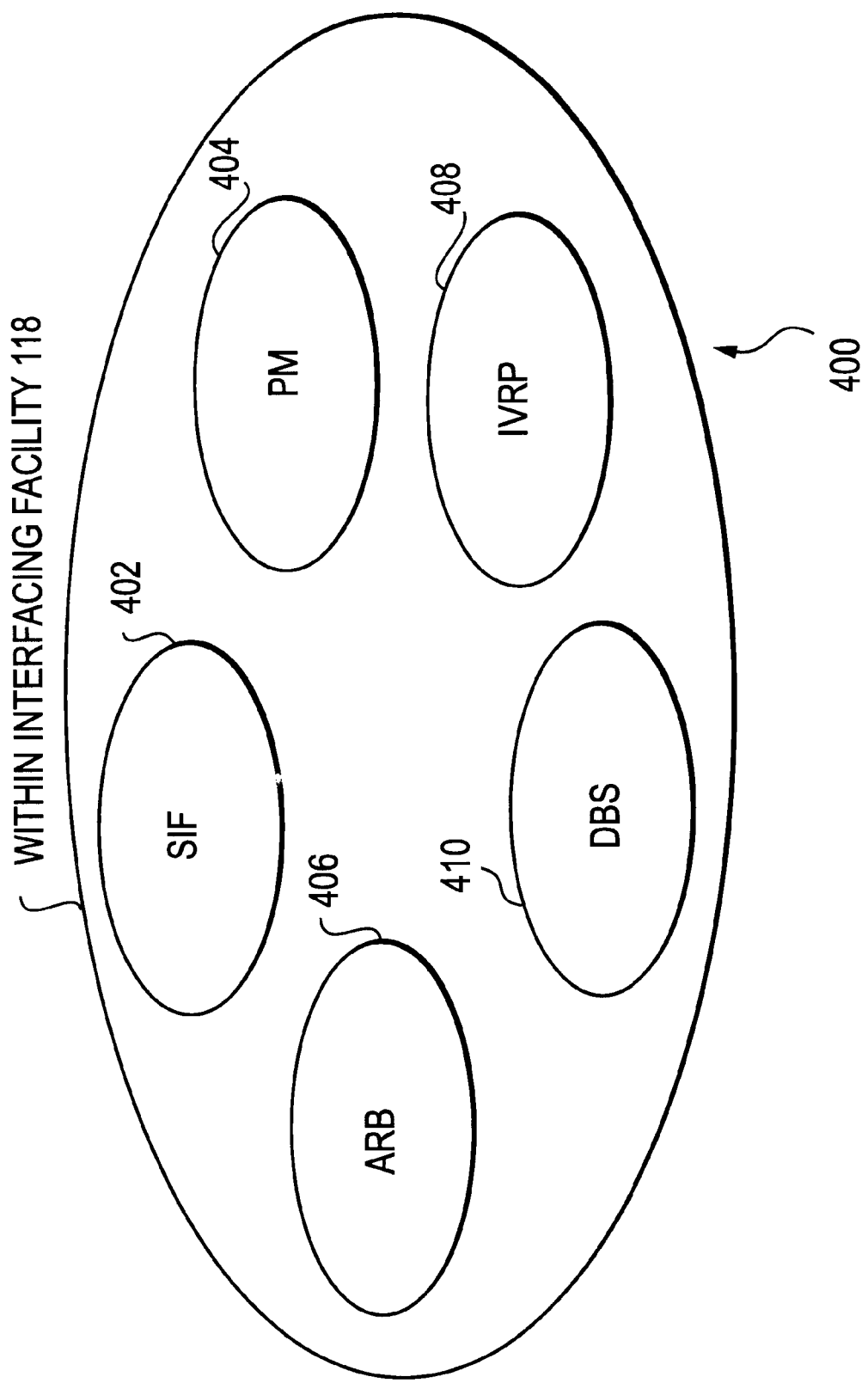

A SAMPLE VCO 4K $DD REPORT INDICATING A NEW CALL.

WHEN A NEW CALL COMES IN, THE VCO 4K GENERATES AN "IMPULSE RULE COMPLETE" REPORT AND SHOVES THAT REPORT IN A SOCKET df 40 80 00 dd 00 00 04 68 00 00 01 00 00 05 db 80

600

| BYTE OFFSET | BYTE NAME | HEX VALUE | MEANING IN THIS INSTANCE |
|---|---|---|---|
| 0 | SOURCE VCA | df | FROM: SWITCH |
| 1 | DESTINATION VCA | 40 | TO: HOST |
| 2 | NETWORK CONTROL | 80 | DO NOT RETURN OR ECHO THIS MESSAGE |
| 3 | NETWORK STATUS | 00 | NO ERRORS IN THIS MESSAGE |
| 4 | FUNCTION ID | dd | THIS MESSAGE IS AN INPULSE RULE COMPLETE REPORT |
| 5-8 | CONTROLLING PORT ADDRESS | 00 00 04 68 | NEW CALL HAS ARRIVED AT PORT 0x468 |
| 9-10 | SPACER BYTES | 00 00 | |
| 11 | SEGMENT CONTROL | 01 | ONE OPTIONAL SEGMENT WILL BE TACKED ON TO THE END OF THIS REPORT |
| 12 | RULE STATUS | 00 | A VOICE PORT WAS AVAILABLE WHEN THE CALL APPEARED AND ALL OF THE DEFAULT ACTIONS (INPULSE RULE) COMPLETE IF SUCCESSFULLY WHEN THE CALL APPEARED |
| 13-14 | INPULSE RULE NUMBER | 00 05 | INPULSE RULE 5 EXECUTED |
| 15 | OPTIONAL SEGMENT ID | db | INCOMING PORT CHANGE OF STATE FOLLOWS |
| 16 | CHANGE | 80 | PORT IN REPORT (0x468) BECAME ACTIVE |

FIG. 6

A SAMPLE IM38 INDICATING A NEW CALL.

EVENTUALLY THIS $DD REPORT IS TURNED INTO AN IM (INTERNAL MESSAGE) 38.

```
FF  00  1B  26  00  07  00  05  00  da  00  01  00  03  00
0a  05  01  02  04  02  05  09  07  07  07  00  00  01  01
```
700

| BYTE OFFSET | BYTE NAME | HEX VALUE | MEANING IN THIS INSTANCE |
|---|---|---|---|
| 0 | FRAMING | FF | MESSAGE BEGINS |
| 1-2 | LENGTH | 00 1b | REMAINDER OF MESSAGE IS 27 BYTES IN LENGTH |
| 3 | MESSAGE ID | 26 | NEW CALL NOTIFICATION |
| 4-5 | SWITCH ID | 00 07 | CALL OCCURRED ON SWITCH 7 IN THE NETWORK |
| 6-9 | SESSION ID | 00 05 00 DA | TELEPHONE CALL HAS BEEN GIVEN A UNIQUE IDENTIFIER OF 0x500DA |
| 10-11 | TRUNKGROUP | 00 01 | CALL SEIZED INWARD ON TRUNKGROUP 1 OF SWITCH 7 |
| 12-13 | TRUNKGROUP MEMBER | 00 03 | CALL SEIZED INWARD ON MEMBER 3 OF TRUNKGROUP 1 ON SWITCH 7 |
| 14 | NUM DIGITS IN ANI | 00 | ANI NOT GIVEN |
| 15 | NUM DIGITS IN DNIS | 0A | 10 DIGIT DNIS FOLLOWS |
| 16-25 | DNIS | 05 01 02 04 02 05 09 07 07 07 | DNIS IS 512.425.9777 |
| 26 | OTHER DIGITS 1 | 00 | NO DIGITS GIVEN IN OTHER DIGITS 1 |
| 27 | OTHER DIGITS 2 | 00 | NO DIGITS GIVEN IN OTHER DIGITS 2 |
| 28 | ACCESS TYPE | 01 | (DEPRECATED) |
| 29 | CALL TYPE | 01 | (DEPRECATED) |

FIG. 7

SYSTEM AND METHOD FOR COMMUNICATING WITH AND CONTROLLING DISPARATE TELECOMMUNICATIONS DEVICES IN A TELECOMMUNICATIONS NETWORK

BACKGROUND OF THE INVENTION

1. Field of the Invention

The present invention relates to systems and methods used to communicate with and control telecommunications devices in telephonic networks such as those configured to transport and process voice and data calls.

2. Description of the Related Art

Modern telecommunications networks typically include and utilize a varied array of telecommunications devices such as call routing switches, hubs, routers, etc. Many, if not most, devices are intelligent in terms of their ability to generate and receive messages and instructions (directives) related to particular call processing, routing, and the like. Such intelligence is realized by a device's ability to be programmed such as via software logic and the like.

For example, devices known as Interactive Voice Response Units (IVRUs) typically are used to automatically respond to calls such as by audibly prompting callers with pre-defined (digitally recorded) voice messages such as those used in call centers to route callers to particular response facilities or personnel. Such IVRUs typically work in conjunction with call routing switches and complex database facilities that generate and transmit messages and directives which are realized in automatic call response. Such messages can includes directives and other information related to the existence of a new call arriving at a particular switch, how a particular set of IVRU facilities will respond to the call, and other call processing parameters such as billing and call tracking information.

The intelligent nature of such telecommunications devices has allowed telecommunications providers such as Inter-Exchange Carriers (IXCs), etc. to offer wide varieties of communications services that connect people in ways never thought possible. Unfortunately, however, as telecommunications services providers face consumer desires for more and richer telecommunications services, they also are faced with significant problems in terms of interfacing and coupling disparate telecommunications devices to deliver expanded functionality. Such problems are exacerbated by the fact that telecommunications providers often must install and operate devices that are manufactured by a multitude of vendors, that operate based on a unique, possibly proprietary, messaging schemes, and that may not interface with other telecommunications devices without requiring significant effort in terms of customization and configuration.

For example, in the debit card and pre-paid calling card industries, service providers such as IXCs often must integrate devices such as switches and IVRUs manufactured by numerous vendors to deliver a particular feature set. Such devices may be configured to operate upon messages formatted according to a proprietary or open-standards based scheme. Currently, the only way to integrate such devices is to manage the messages generated by and sent to the same using complex, customized software and computing platforms and the like. A particular device's vocabulary and messaging format may be totally and completely different from others thus making difficult the combination of device specific features to deliver new and feature rich services and the like. And, beside offering new services, billing and call tracking related to existing services also are compounded by the difficulty of combining disparate telecommunications devices manufactured by a multitude of vendors. The difficulties associated with billing and call tracking can prevent development and deployment of pre-paid card services, for example, which, ultimately, prevents callers from realizing and enjoying new, telecommunications services.

Thus there exists a need to provide new and improved systems and methods that will allow telecommunications service providers to integrate disparate telecommunications devices and that will facilitate effective and efficient communications with and control of the same. To be viable such systems and methods must be capable of receiving disparate device messages, understanding the same, translating such disparate device messages, and generating outbound device specific directives so that such systems and methods act as interfaces. The present invention addresses the aforementioned problems and needs squarely and provides such new and improved systems and methods as described below.

SUMMARY OF THE INVENTION

The present invention solves the aforementioned problems and provides new and improved systems and methods that permit telecommunications devices within a telecommunications network such as those communicating based on disparate messaging schemes relative to each other to be addressed and controlled via a generalized interfacing facility. Accordingly, the present invention permits telecommunications providers and other parties involved in enabling, deploying, provisioning, or otherwise operating telecommunications services such as debit card and pre-paid telephone card services to efficiently deploy hardware devices and systems that operate based on a multitude of communications protocols.

The present invention's interfacing facility permits inbound device specific messages (e.g., vendor specific messages, etc.) to be received and parsed for data related to other telecommunications processes (e.g., call detail processes, call billing processes, database operations, etc.). Once data is parsed (e.g., extracted for use in performing other call related processes), an outbound message formatted in accordance with possibly another device specific messaging format (e.g., a vendor specific messaging format, etc.) may be generated and sent to another telecommunications device (e.g., a switch, router, hub, etc.) for processing thereby. In other words, the present invention permits disparate telecommunications to be addressed ("spoken to") and controlled without requiring highly customized systems and the like.

As such, significant benefits are realized as a result of deployment of the present invention. For example, telecommunications providers now can deploy feature rich services and gather and process data from a multitude of telecommunications devices which heretofore have been unable to easily and efficiently communicate with each other. By providing an interfacing facility coupled to telecommunications devices within a telecommunications network, service providers (e.g., Inter-Exchange Carriers, etc.) now can focus development efforts and resources on service features and functionalities instead of on device/vendor specific messaging schemes. Consumers of telecommunications services are now able to enjoy and utilize richer services as a result of the device interfacing capabilities provided by the present invention.

In achieving the aforementioned benefits, the present invention provides new and improved systems and methods for communicating with and controlling disparate telecommunications devices in a telecommunications network. Such new and improved systems and methods include and involve a first telecommunications device configured to communicate within a telecommunications network according to a first messaging format, a second telecommunications device configured to communicate within the telecommunications network according to a second messaging format, and an interfacing facility. The interfacing facility communications with the first and second telecommunications devices via the telecommunications network. The interfacing facility also is configured to detect and receive a first external message formatted in accordance with the first messaging format from the first telecommunications device, to extract data from the first external message, to generate an internal message based on the data extracted from the first external message, to generate a second external message based on the internal message and the second messaging format, and to send the second external message to the second telecommunications device. The second telecommunications device is configured to operate (e.g., be controlled by, etc.) in accordance with the second external message.

According to another aspect of the present invention, provided is an interfacing facility for use in a telecommunications network. The interfacing facility includes and involves a message receipt facility configured to receive a first device specific message from a first telecommunications device. The first device specific message is related to a call to be processed within the telecommunications network. The interfacing facility also includes a message translation facility which is configured to translate the first device specific message into an internal message configured to be processed by a task facility, and a message generation facility which is configured to receive the internal message from the message translation facility after the internal message has been processed by the task facility, and to generate and send a second device specific message corresponding to a second telecommunications device for processing thereby.

And, according to another aspect of the present invention, provided is a method for communicating with and controlling disparate telecommunications devices in a telecommunications network. The method includes the steps of receiving a first device specific message from a first telecommunications device within the telecommunications network. The first device specific message is related to a call to be processed within the telecommunications network. The method further includes the steps of translating the first device specific message into an internal message configured to be processed by a task facility, and generating a second device specific message corresponding to a second telecommunications device after the task facility has processed the internal message.

The present invention is discussed in detail below with regard to several attached drawing figures which are next briefly described.

BRIEF DESCRIPTION OF THE DRAWINGS FIGURES

The present invention is described in detail below with reference to the attached drawing figures, of which:

FIG. 4A is a diagram of software system used within the system shown in FIG. 1 to perform, among other things, translations of external device specific messages to internal messages which may be processed by call processing related task facilities (e.g., billing, tracking, routing, etc.) in accordance with a preferred embodiment of the present invention;

FIG. 6 is a diagram of a device specific message (external message) and its corresponding byte offsets (field specifications) prior to translation by translation facilities provided in accordance with the present invention;

FIG. 7 is a diagram of an internal message and its corresponding byte offsets (field specifications) after translation of the device specific message shown in FIG. 6 by translation facilities provided in accordance with the present invention;

Figure 8A:
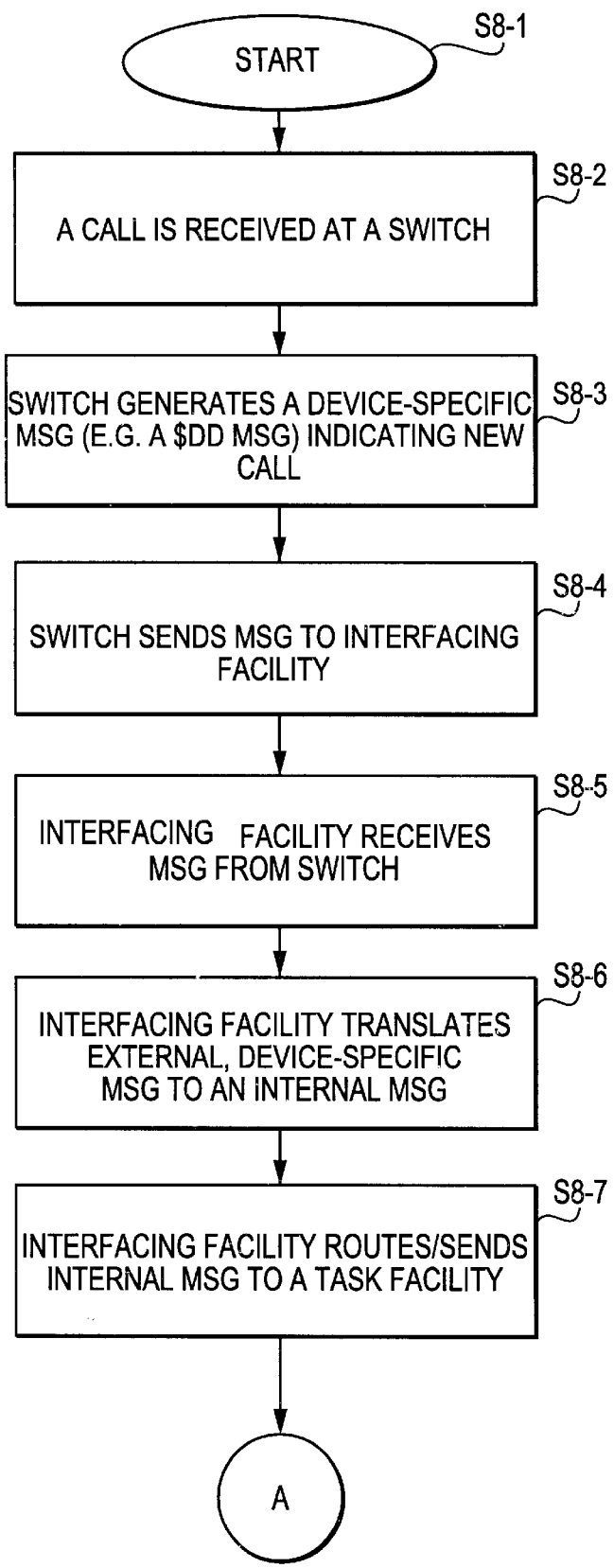
Figure 8B:
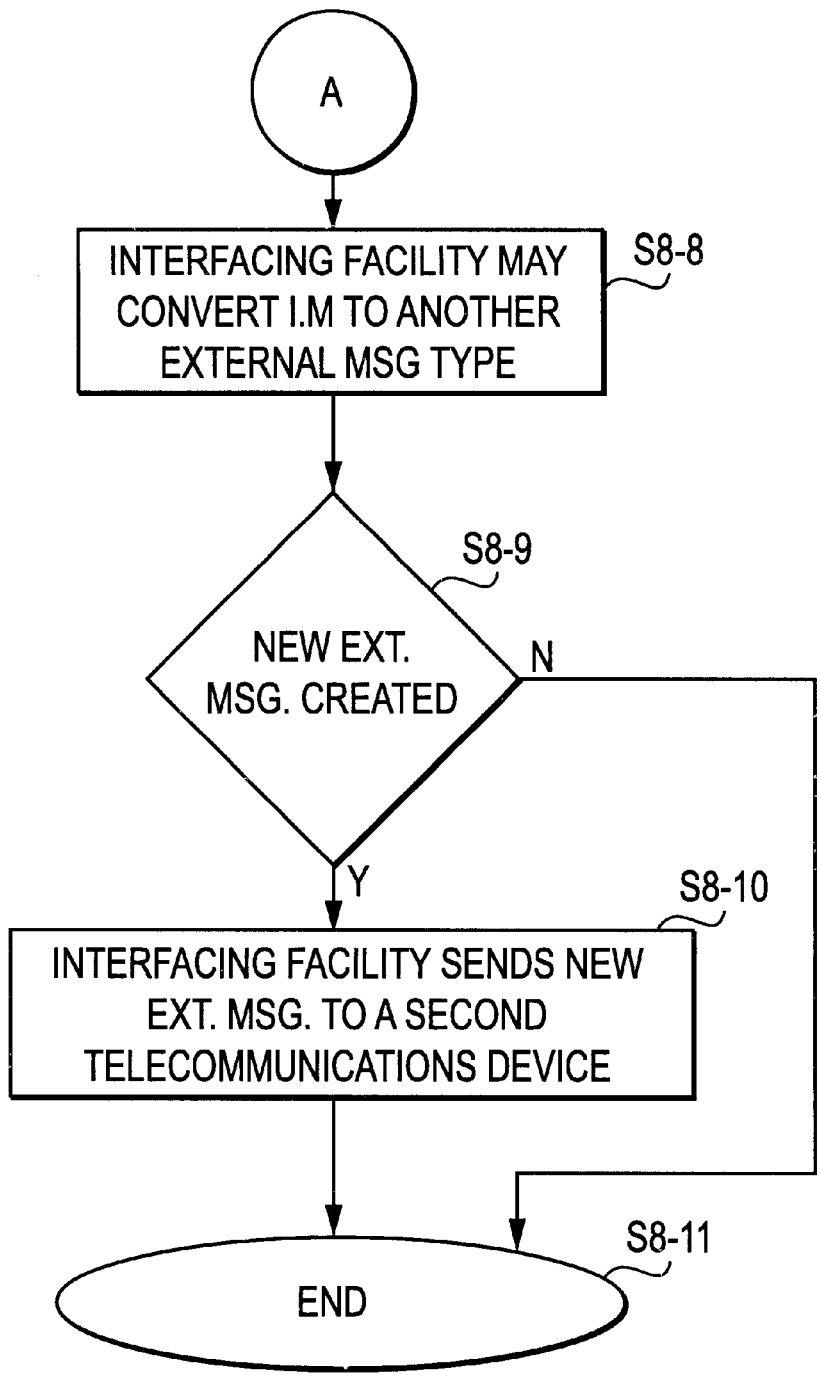

FIG. 8A is a flowchart that illustrates a process by which external messages such as those shown in FIG. 6 are translated into internal messages such as those shown in FIG. 7 which may be used by internal processes (e.g., billing processes, call routing processes, etc.) in accordance with a preferred embodiment of the present invention; and FIG. 8B is the conclusion of the flowchart started in FIG. 8A.

DETAILED DESCRIPTION OF THE PREFERRED EMBODIMENTS

The present invention is now discussed in detail with regard to the attached drawing figures which were briefly described above. Unless otherwise indicated, like parts and processes are referred to with like reference numerals.

Figure 1:
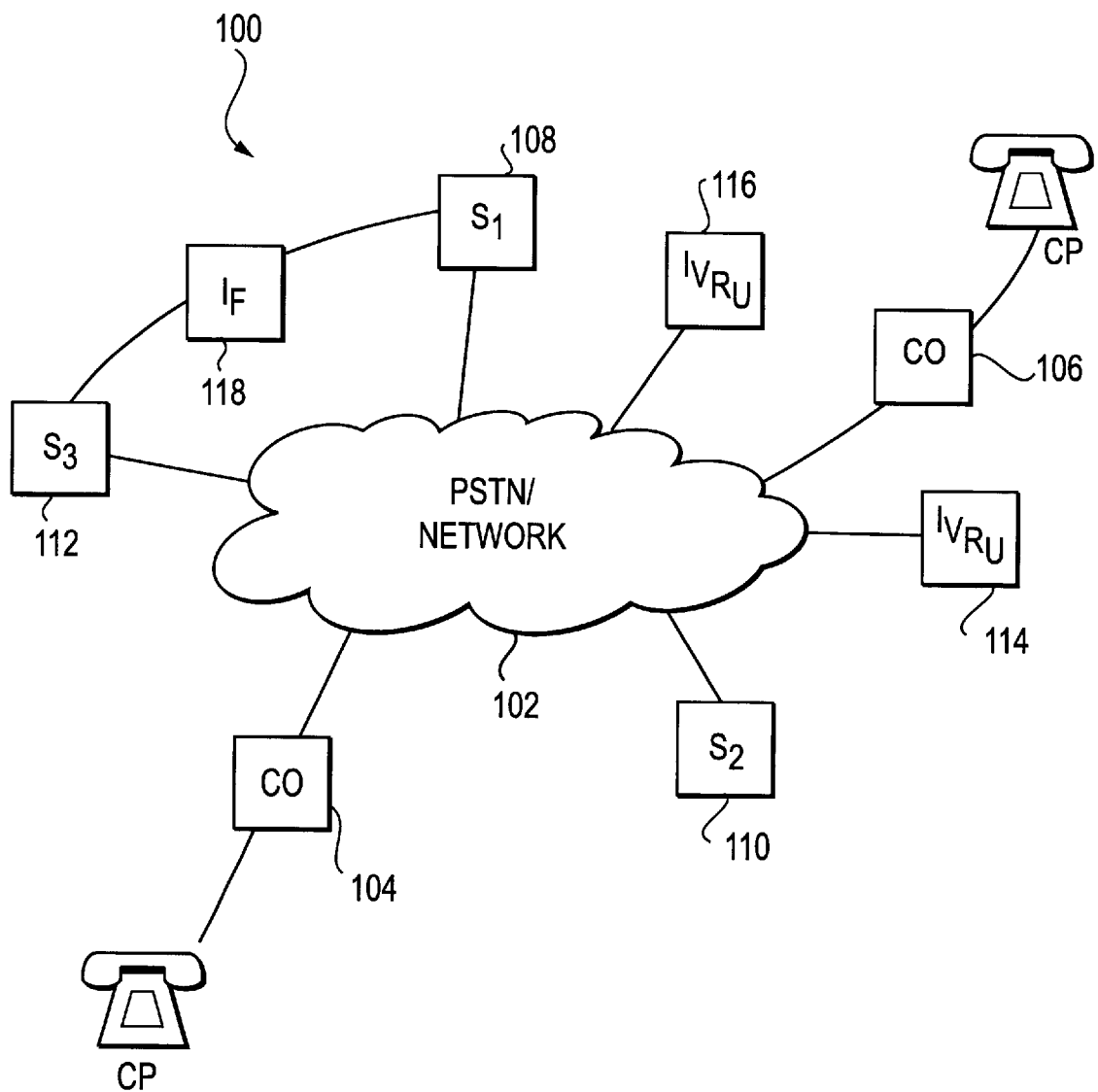
FIG. 1 is a network diagram of a telecommunications system in which disparate telecommunications devices may be instructed and controlled in accordance with a preferred embodiment of the present invention.

Referring now to FIG. 1, depicted therein is a diagram of a telecommunications system in which disparate telecommunications devices such as switches manufactured by a multitude of vendors may be instructed and controlled in accordance with a preferred embodiment of the present invention. In particular, system 100 includes a network such as the publicly switched telephone network (PSTN) 102, central office systems 104, 106, calling parties CP, switching systems and platforms 108, 110 and 112, interactive response units and systems 114 and 116, and an interfacing facility 118 which is shown as being coupled to two disparate switching system 108 and 112. Interfacing facility 118 may include switch interfacing facilities to permit disparate telecommunications devices to be instructed and controlled in accordance with the present invention.

The structures within system 100 are exemplary and it certainly is envisioned that numerous other telecommunications devices, data processing systems, networks, and other structures and systems may be included therein. Accordingly, the present invention is not to be limited in any way to the structures and corresponding interconnections shown in FIG. 1 and the other drawing figures attached to this patent document and discussed in detail below.

Figure 2:
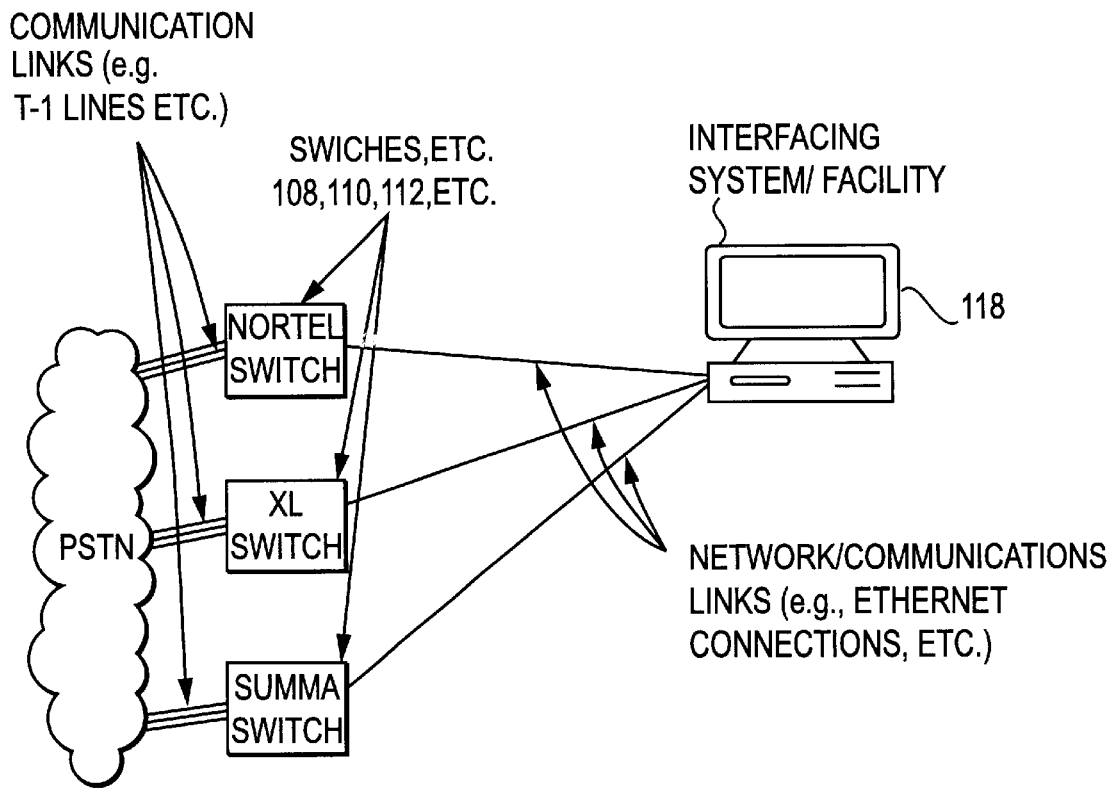
FIG. 2 is a diagram that illustrates physical relationships and data flows among component parts of the system shown in FIG. 1.

Referring now to FIG. 2, depicted therein is a diagram that illustrates physical relationships and data flows among component parts of system 100 as shown in FIG. 1. In particular, switches 108, 110, 112, etc. which are manufactured by different manufactures, may be coupled to the PSTN via communications links in a conventional way. Such switches would normally require complex, specialized and often custom interfacing systems to permit telecommunication providers to interact with the same. In accordance with the present invention, however, interfacing facility (and systems) 118 is coupled to such switching systems by a network/communications links such as Ethernet connections, etc., to allow for corresponding control via a single user interface which understands and deciphers device specific messages and which can process the same internally.

Figure 3:
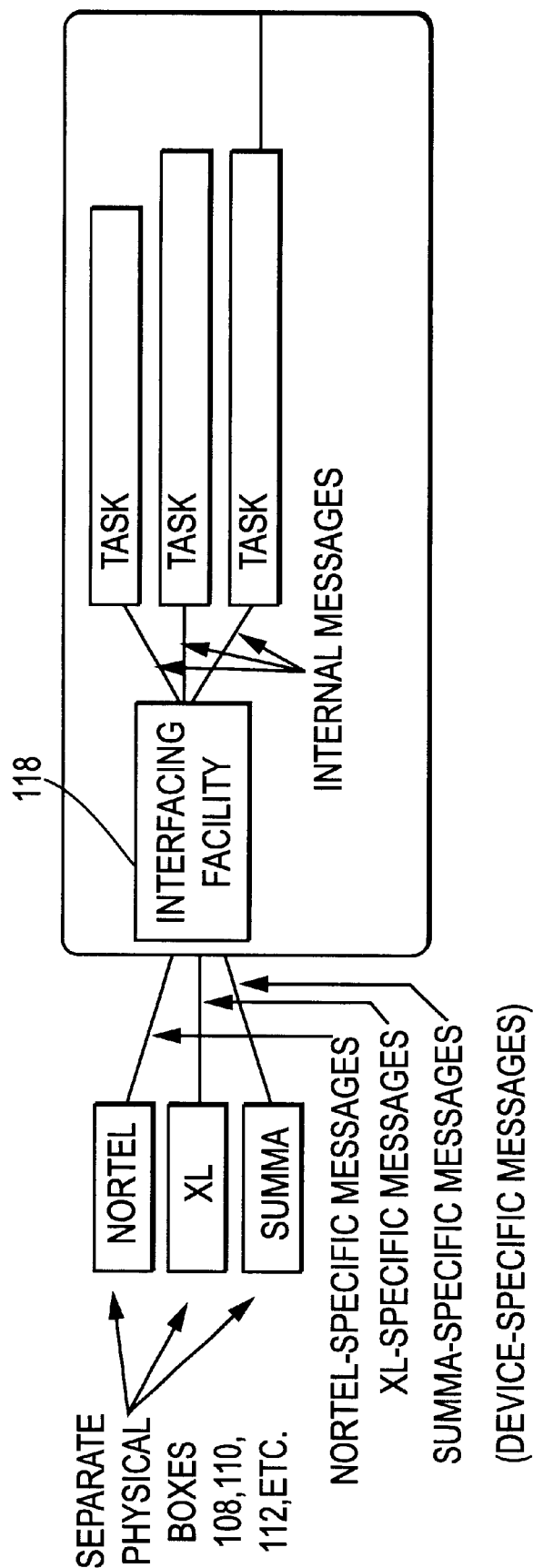
FIG. 3 is a diagram that illustrate logical relationships and data flows among component parts of the system shown in FIG. 1.

Referring now to FIG. 3, depicted therein is a diagram that illustrates logical relationships and data flows among the component parts of system 100 as shown in FIG. 1 and as described with reference to FIG. 2. In particular, switching systems 108, 110, 112, etc., manufactured by disparate vendors, generate device specific messages, which are transmitted to interfacing facility 118. Interfacing facility 118 will translate device specific messages into internal messages which may be processed by tasks and corresponding task facilities maintained within interfacing facility 118, as part of the same or as separate devices and facilities which may be accessed via network communication links.

Referring now to FIG. 4A, depicted therein is a software system diagram that illustrates certain software modules found within interfacing facility 118 which may be used to perform, among other things, translations of external device specific messages to internal messages which may be processed by call processing related task facilities such as billing, tracking, routing, call processing tasks, etc. in accordance with a preferred embodiment of the present invention. In particular, software system 400 includes objects and facilities such as a switch interface facility 402, a progress monitor 404, an arbitrator 406, interactive voice response processes 408, and a data base server facility 410. Such software modules may be implemented using a object oriented programming environment such as C and C++. Thus, the communications among tasks running within software system 400 will be immediately understood by those skilled in the art after reviewing this patent document.

Switch interface facility 402 receives and sends all external messages within interfacing facility 118 (FIG. 1). For example, every peripheral connected to a telecommunications network—via a telephone switch, a router, or signaling box—reports to and accepts commands from switch interface facility 402. Switch interface facility 402 also communicates with the arbitrator 406 and progress monitor 404 tasks to notify the presence of a new call and to receive instructions on what to do with a particular switch. Switch interface facility 402 is like a mid-level manager. It takes orders from the logical core of software system 400 (the arbitrator and progress monitor) and translates those orders into switch commands. When a switch coupled to switch interface facility 402 completes an action, switch interface facility 402 then reports back to the logical core of software 400.

Arbitrator 406 exists to make decisions (to arbitrate) as to whether a new call is valid or not. To do this task, arbitrator 406 receives notices from switch interface 402 that a new call with certain characteristics (in coming number, on a certain switch, etc.) has arrived. Arbitrator 406 then passes such information to database server 410 to see if everything related to the call is in proper order. If so, the new call accepted and, if not, the call is rejected. Together with progress monitor 404 (as discussed below), arbitrator 406 makes up part of the logical core of software system 400.

Progress monitor 404 is the brain of software system 400. In particular, assuming arbitrator 406 accepts a new call into the system as valid, progress monitor 404 watches the state of the call and decides what, if anything, should be done to the call. It is one of the duties of progress monitor 404 to tell switch interface 402 what a particular switch should do relative to a particular call. Progress monitor 404 is the source of generated switch commands. Together with arbitrator 406, progress monitor 404 makes up part of the logical core of software system 400.

Database server 410 dips into appropriate databases when requested relative to particular calls and other tasks that may be carried out in accordance with the present invention. Arbitrator 406 may ask the database server to validate a new call. Progress monitor 404 may ask the database how a string of digits should be modified. An IVRP system may ask database server 410 for IVR settings such as how long to wait for a digit before timing out, etc.

Interactive voice response process 408 governs a part of a box called an IVRU (interactive voice response unit). When a call reaches an IVRP process, the IVRP talks with database server 410 to figure out how to behave (such as when to wait for digits and when to terminate a call, etc.). IVRP processes 408 govern DSP hardware (digital signal processor hardware) that collects digits and plays prompts while such resources are necessary for a call.

In the aforementioned discussion facilities found within interfacing facility 118 and, in particular, within software system 400, the term "external message" or (EM) means any of the hardware or protocol formatted messages that are sent from hardware connected to software system 400. Conversely, the term "internal message" (IM) refers to any of the messages sent within software system 400 from one application to another. For example, switch interface facility 402 talks to arbitrator 406 using IM, while switch interface facility talks to physical switches using XMs.

It is important to note when reviewing this patent document, that the term "IVR" is a heavily overloaded term. Technically, it stands for "interactive voice response." IVR however, can refer to the physical chassis that hold DSP cards to play prompts, prompting DSP cards themselves, and/or the application(s) written to control such DSP cards. To avoid confusion, the term IVRU is used within this document to mean the physical chassis that hold DSP cards and the term IVRP (interactive voice response process) to mean the instances of the applications that may be written in accordance with the present invention to control such devices and to operate the same. An IVRP may be an instance of a UNIX program while an IVRU may a piece of hardware. An IVRP controls at least part of the an IVRU.

Figure 4B:
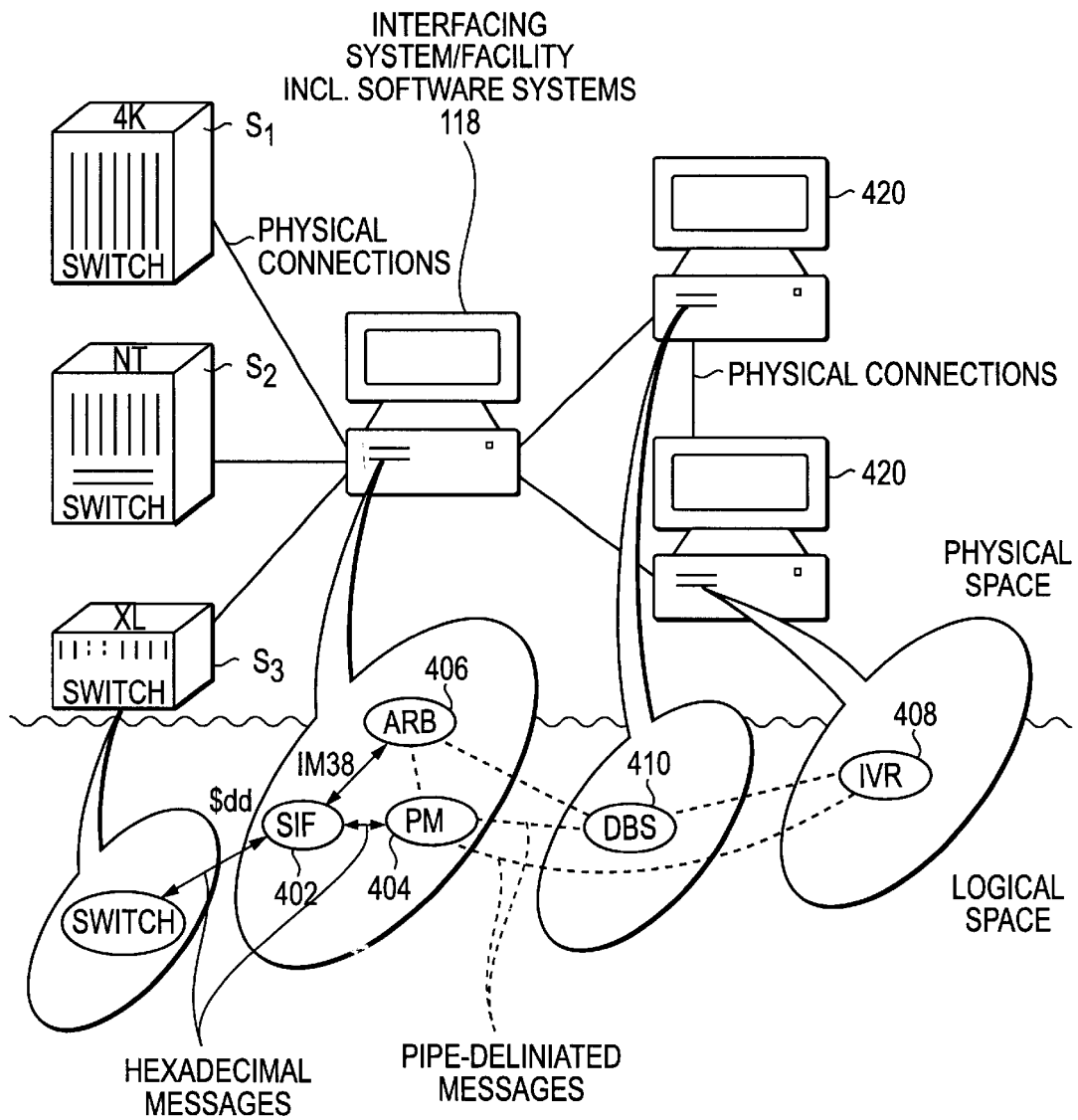
FIG. 4B is a diagram that illustrates physical and logical relationships that are derived as a result of the software objects shown in FIG. 4A.

Referring now to FIG. 4B, depicted therein is a diagram that further illustrates the logical and physical relationships and data flows among the component parts of system 100 in view of software system 400 as shown in FIG. 4A. In particular, depicted in FIG. 4B are communications paths and dialogue paths between the software facilities making up software system 400. Those skilled in the art will readily understand the data flows and communication paths defined and shown within FIG. 4B. Accordingly, for purposes of brevity, further description of FIG. 4B is omitted.

Figure 5:
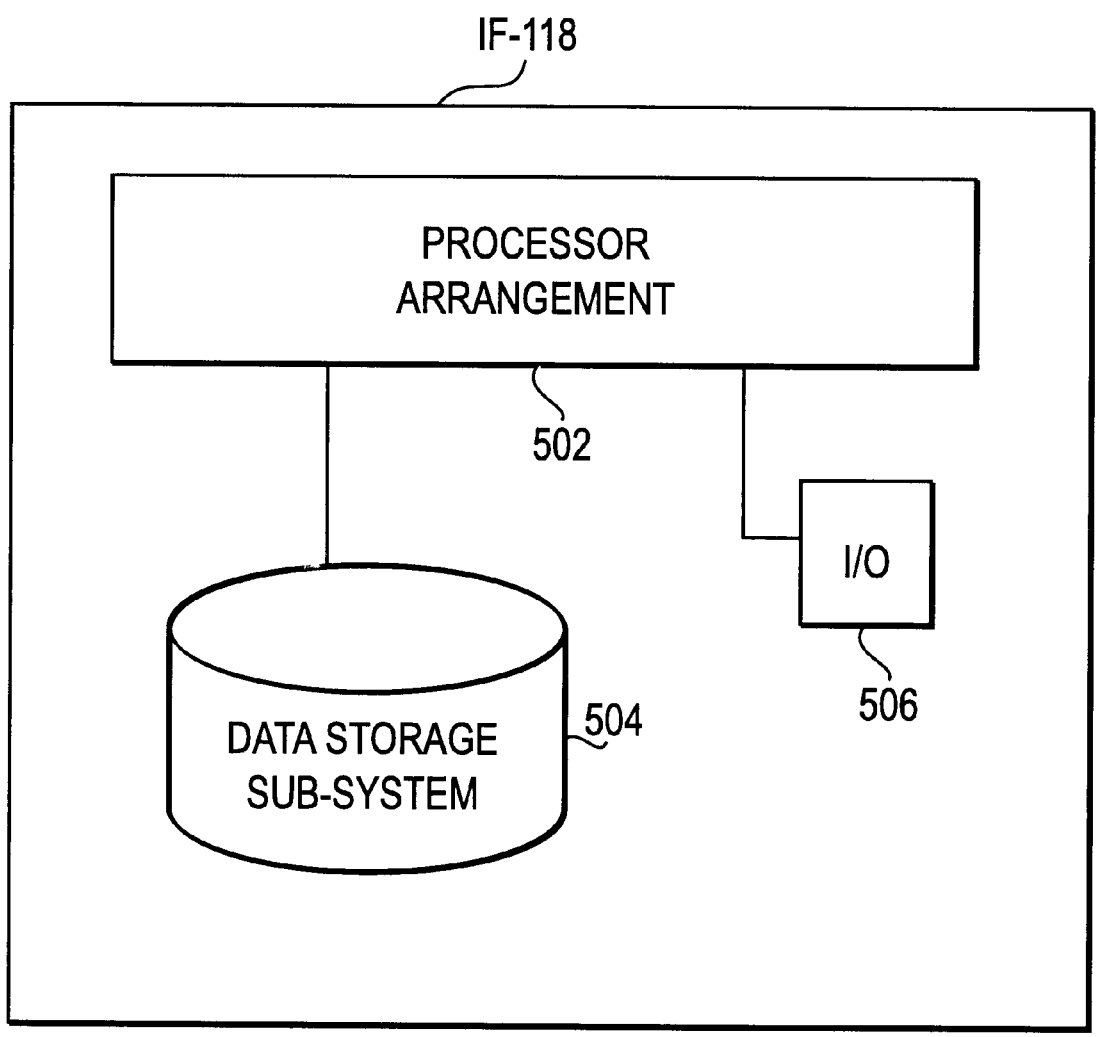
FIG. 5 is a block diagram of a data processing system that is configured to translate external device specific messages to internal messages which may be processed by call processing related task facilities (e.g., billing, tracking, routing, etc.) in accordance with a preferred embodiment of the present invention.

Referring now to FIG. 5, depicted therein is a block diagram of a data processing system that may be configured to operate as interfacing facility 118 (FIG. 1) which is configured to translate external device specific messages into internal messages which may be processed by call processing related task facilities (e.g., billing, tracking, routing, call processing, etc.) in accordance with the preferred embodiment of the present invention. In particular, interfacing facility 118 may include a processor arrangement 502 including one or more processing elements such as central processing units, data storage subsystems 504 which may include disk and data processing systems storage facilities, and I/O 506 to allow interfacing facility 118 to interface with other structures and processes as shown within system 100 of FIG. 1 and the other figures attached to this patent document.

Referring now to FIG. 6, depicted therein is a diagram of a device specific message (e.g., an external message) and its corresponding byte offsets (field specifications) prior to translation by translation and interfacing facilities provided in accordance with the present invention. FIG. 6 depicts, in particular, a sample VCO 4K switch message referred to as a "$dd" report indicating the presence of a new call at a switch platform such as a switch platform manufactured by SUMMA CORPORATION. Furthermore, when a new call arrives at a switch, the SUMMA switching platform generates an "impulse rule complete report" and shoves the report into a socket. The corresponding digital message corresponding to a $dd report is shown at reference numeral 600. And, at reference numeral 602 a table illustrates the byte offsets and the corresponding data values that would be maintained therein. The parsing of the $dd report in accordance with the present invention is described in detail below with regard to FIGS. 8A and 8B.

Referring now to FIG. 7, depicted therein is a diagram of a internal message referred to as an IM38 message and its corresponding byte offsets (field specifications) after translation of the device specific message shown in FIG. 6 by translation and interfacing facilities provided in accordance with the present invention. In particular, the $dd report 600 shown in FIG. 6 will be converted into an internal message IM38 as shown at reference numeral 700. The corresponding byte offsets and field descriptions related to the internal message 700 are shown at a table 702.

The structural aspects of the present invention as described above and which are used to generate internal messages based upon device specific messages as shown in FIGS. 6 and 7, respectively, are designed and configured in accordance with the present invention to operate together. The operations necessary to carry out such translations and interfacing features are next described with reference to FIGS. 8A and 8B and the exemplary computer source code contained within this document.

Referring now to FIG. 8A, depicted therein is a flow chart that illustrates a process by which external messages such as those shown in FIG. 6 are translated into internal messages such as those shown in FIG. 7 which may be used by internal processes (e.g., billing processes, call routing processes, etc.) in accordance with a preferred embodiment of the present invention. In particular, processing starts at step S8-1 and immediately proceeds to step S8-2.

At step S8-2 a call is received at a switching facility platform.

Next at step S8-3, the switching facility generates a device specific message (e.g., a $dd message as shown in FIG. 6) indicating the existence of a new call at the switching platform.

Next at step S8-4, the switch sends the message to an interfacing facility such as interfacing facility 118 (FIG. 1) as provided by the present invention.

Next at step S8-5, the interfacing facility (e.g., interfacing facility 118) receives the message from the switching platform.

Thereafter, at step S8-6, interfacing facility 118 translates the external device specific message into an internal message. Such processes may be carried out in accordance with software modules such as those described with reference to FIGS. 4A and 4B which may be written in a computer language such as C/C++ and which may run on a UNIX based data processing platform such as one similar or like interfacing facility 118 as shown in FIG. 5. To illustrate the processes and, in particular, the programming constructs which may be implemented to perform such translations to provide the interfacing functionality of the present invention, below the reader will find computer software listings for translation routines that may be used to translate, among other messages, $dd reports such as those shown in FIG. 6 into internal messages which may be used by down stream systems and processes. In particular, the following source code listings illustrate the translation of external, device specific messages formatted relative to a SUMMA based switching platform (e.g., a SUMMA Switch) into internal messages. The below listed source code has been fully commented to assist the reader in comprehending the structural and operational aspects of the translations necessary to achieve the interfacing capability of the present invention.

The below listed source code is merely exemplary and does not limit the present invention in any way. At least portions of the below listed source code are copyrighted material of the belonging to the Assignee of record. Copyright © 1999 SIMPLIFIED TELESYS, Inc. All Rights Reserved.

```
s4_process_msg reads data from a socket, and if a complete message
exists shoves the data from the socket into a buffer.
after a buffer is filled up, s4_process_msg calls s4_unpack_msg to transfer data
from the filled-up buffer to an S4_EVTDATA struct.
note s4_process_msg only calls s4_process_msg if the message found in the
socket is a *switch report*. the switch also sends *acknowledgements* (in
response to host commands). these acknowledgements are *not* put
into a structure and passed on. in other words, we don't handle
acknowledgements.
hat calls s4_process_msg? */
in't make evtdata const bc it's values are changed here */
stead of passing in srcid, we could pass in PROCESS *process
    and use process->srcid instead; this would make the interface to
```

```
        s4_process_msg more like that to the other functions */
process_msg (int srcid)
    EVENT evtdata;
    EV_SOURCE                       *s;         /* structure holding info about a source */
    static S4_EVTDATA s4evt;        /* structure to be filled by (*this) with information about data read
                                       from the source corresponding to srcid. s4evt will only be filled
        data in srcid's socket is valid data. if the S4_EVTDATA is filled, then a ptr to it is passed to s4_unpack_message.
        why is s4evt static? s4evt is filled up with values the buffer; then s4evt is tacked-on to evtdata, using vtdata's void *data. when this function
        goes out of scope, evtdata->data will still have values. */
    size_t br;                                  /* bytes returned when recv() is called */
    size_t to_read;                             /* number of total bytes in message,
                                                        including precursor bytes */
    uint8 buf[S4_BUFSIZE+2];        /* includes length bytes */
    int                             ret;        /* num of bytes ret'd from s4_unpack_msg */
    PROCESS                         *proc;
    SW_SWITCH                       *sw;
    s = ev_get_source_info (srcid);
    if(s == NULL) {
        log_write (0, 2, "ERROR: couldn't get source.");
        return (-1);
    }
    sw = sw_get_switch (s->id);
    if (sw == NULL) {
        log_write (0, 2, "ERROR: couldn't get switch");
        return (-1);
    }
    /*
        store up to S4_BUFSIZE bytes read from the socket associated with srcid,
        into buffer 'buf'. peek ahead so as to not change the contents of the
        socket's data. this is how data gets from the socket into the buffer.
    */
    or = recv (s->fd, buf, S4_BUFSIZE, MSG_PEEK);
    f (br < 0)
        switch (errno) {
            case ECONNRESET:
                log_write (0, 2, "CONNECTION RESET");
                return (0);
                break;
            default:
                sys_err ("reading data from a socket", _FILE_, _LINE_-8);
                return (-1);
        }
    }
    else if (br == 0) {
        log_write (0, 0, "ERROR: invalid number of bytes received in process_evt");
        log_write (0, 0, "ERROR: br = %d", br);
        return (0);
    }
    /* each message contains two precursor bytes which indicate the */
    /* remaining number of bytes to read. */
    to_read = UINT16 (buf[1], buf[0]);
    to_read += 2;
    if (br < to_read) { /* entire message hasn't arrived yet */
        return (-1);
    }
    /* reread socket, this time purging the message read above. */
    br = recv (s->fd, buf, to_read, 0);
    if (br < 0) {
        switch (errno) {
            case ECONNRESET:
                return (0);
                break;
            default:
                sys_err ("reading data from a socket", _FILE_, _LINE_-8);
                return (-1);
        }
    }
    if (br != to_read) {
        log_write (0, 1, "ERROR: number of bytes reported on socket doesn't match actual amount");
        return (-1);
    }
    /* the precursor bytes *are* indeed logged in the following ... */
    log_packet (LOG_IN, "H", s->desc[0] == '\0' ? "S" : s->desc, buf, br);
    /* ... but s4_unpack_msg begins reading the buffer *after* the
        precursor bytes; hence the passing of &buf[2].
        that is, S4_EVTDATA *s4evt has NO members in which to store the
        precursor bytes so we don't pass those to s4_unpack_msg */
    //log_write(0,9,"I'm in s4_process_msg and i find that buf[6] is %x",buf[6]);
    //log_write(0,9,"Calling s4_unpack_msg . . . ");
```

```
ret = s4_unpack_msg (&buf[2], &s4evt, br-2);
if (ret < 0) {
    return (-1);
}
log_write (0, 3, "Network status: %s", s4_strerror (s4evt.network_status));
/* fill in EVENT structure with data that will later be used in the
    event handler function, namely s4_call_process. */
evtdata.source = EV_S4;
evtdata.type = s4evt.function_id;
evtdata.timestamp.tv_sec = cur_time;
evtdata.srcid = srcid;
evtdata.sess_id = 0;
evtdata.data = (void *) &s4evt;
evtdata.datalen = sizeof (S4_EVTDATA);
proc = pr_get_procinfo (sw->rspmap[s4evt.function_id][0].process_id);
if (proc == NULL) {
    log_sys ("ERROR: Process does not exist");
    log_sys (" process_id = %d",sw->rspmap[s4evt.function_id][0].process_id);
    return (-1);
}
if (proc->proc != NULL) {
    ret = proc->proc (&evtdata, proc);
    if (ret > 1) {
        ev_route_to_default_proc(&evtdata);
        return (1);
    }
}
else {
    return (-1);
}
/* return -1 to tell the ev_wait_for_event () that an event should not be generated. */
return (-1);
}
        /* S4_RPT_INPULSE_RULE_COMPLETE: reports the completion of an inpulse
            rule. this is a macro and may (optionally) contain segments
            tacked on at the end. resource segments included in the macro can
            include:
                incoming port change of state ($db)
                dtmf digit ($d1)
                mf digit ($d0) */
    case S4_RPT_INPULSE_RULE_COMPLETE:
        // welcome message:
        log_write (0, 0, "S4_RPT_INPULSE_RULE_COMPLETE");
        // the exact message length cannot be known in advance.
        // however, the message must be at least 15 bytes:
        if (buflen < 15) {
            log_write (0,9,"ERROR: bad length in S4_RPT_INPULSE_RULE_COMPLETE");
            return (-1);
        }
        // next four bytes contain controlling port address:
        s4evt->u.inpulse_rule_complete.cport = UINT32 (buf[byte+3],
                                                    buf[byte+2], buf[byte+1], buf[byte]);
        byte += 4;
        /* next two bytes are spacer bytes */
        byte += 2;
        /*
            next byte contains segment control
                    ABC00NNN
            A: 0 -> rule processed for incoming port
                1 -> rule process for outgoing port
            B: 0 -> rule not aborted because of looping
                1 -> looping rule aborted automatically
            C: 0 -> no routing performed
                1 -> routing action was performed
            NNN: number of optional segments in the report
        */
        s4evt->u.inpulse_rule_complete.segctl.oport      = BIT (buf[byte],8);
        s4evt->u.inpulse_rule_complete.segctl.loop_abort = BIT (buf[byte],7);
        s4evt->u.inpulse_rule_complete.segctl.routing    = BIT (buf[byte],6);
        s4evt->u.inpulse_rule_complete.segctl.num_segs   = BITRANGE (buf[byte],3,3):
        ++byte;
        /*
            next byte contains rule status
                    AST00000
            A: 0 -> voice port available on initial request
                1 -> voice port not available on initial request
            S: 0 -> inpulse rule completed normally
                1 -> inpulse rule aborted
            T: if S == 1, specifies whether rule was aborted because no
```

-continued

```
        outpulse channel was available
*/
s4evt->u.inpulse_rule_complete.vport_unavailable = BIT (buf[byte], 8);
s4evt->u.inpulse_rule_complete.rule_aborted = BIT (buf[byte], 7);
if (s4evt->u.inpulse_rule_complete.rule_aborted) {
     s4evt->u.inpulse_rule_complete.oport_unavailable = BIT (buf[byte], 6);
} else {
     s4evt->u.inpulse_rule_complete.oport_unavailable = 0;
}
++byte;
// next two bytes contain the number of the inpulse rule which completed:
s4evt->u.inpulse_rule_complete.inpulse_rule = UINT16 (buf[byte+1],buf[byte]);
byte += 2;
/*   the rest of the message contains optional segments, as defined
     in the segment control byte.
     these segments correspond to function ids.
     the only possibilities are S4_RPT_IPORT_CHANGE_STATE,
     S4_RPT_DTMF_DIGIT, and S4_RPT_MF_DIGIT. */
// for every optional segment attached to this report . . .
for (ct = 0; ct < s4evt->u.inpulse_rule_complete.segctl.num_segs; cl++)
{
     // store the function id of the optional segment:
     s4evt->u.inpulse_rule_complete.opt[ct].function_id = buf[byte++];
     // then look at the function id of the optional segment . . .
     switch (s4evt->u.inpulse_rule_complete.opt[ct].function_id)
     {
          // . . . and if the segment is an incoming port change state . . .
          case S4_RPT_IPORT_CHANGE_STATE:
              // store only the change code for that incoming port:
              s4evt->u.inpulse_rule_complete.opt[ct].iport_change_code = buf[byte++];
              break;
          // . . . and if the segment is a report of dtmf digits . . .
          case S4_RPT_DTMF_DIGIT:
              /* the controlling port address, the report status and
                   the supervision bytes are all omitted, so the next
                   byte is the DTMF receiver address. */
              s4evt->u.inpulse_rule_complete.opt[ct].dtmf_digit.raddr =
                                     UINT32 (buf[byte+3],buf[byte+2],buf[byte+1],buf[byte]);
              byte += 4;
          /*   next byte is the DTMF status byte.
                                   ET0VWXYZ
              E: is this the enhanced-style report? 1 = yes, 0 = no
              T: was the interdigit timer fired? 1 = yes, 0 = no
              V: is this a first digit report? 1 = yes, 0 = no.
                   If yes, then a max of 1 digit is reported in the
                   digit string.
              W: specifies whether the DTMF receiver requested was
                   available.
                   1 = available, 0 = not available.
              X: did DTMF collection timer fire? 1 = yes.
              Y: did first digit timer fire? 1 = yes.
              Z: does this report contain a digit string? 1 = yes. */
              s4evt->u.inpulse_rule_complete.opt[ct].dtmf_digit.enhanced =
                                     BIT (buf[byte], 8);
              s4evt->u.inpulse_rule_complete.opt[ct].dtmf_digit.
                                     interdigit_timer = BIT (buf[byte], 7);
              s4evt->u.inpulse_rule_complete.opt[ct].dtmf_digit.
                                     first_digit = BIT (buf[byte], 5);
              s4evt->u.inpulse_rule_complete.opt[ct].dtmf_digit.
                                     receiver_available = BIT (buf[byte], 4);
              s4evt->u.inpulse_rule_complete.opt[ct].dtmf_digit.
                                     collection_timer = BIT (buf[byte], 3);
              s4evt->u.inpulse_rule_complete.opt[ct].dtmf_digit.
                                     first_digit_timer = BIT (buf[byte], 2);
              s4evt->u.inpulse_rule_complete.opt[ct].dtmf_digit.
                                     got_digits = BIT (buf[byte], 1);
              ++byte;
              /* in the enhanced version of this report, there are two
                   extra bytes. the first of which is the field designator
                   (number of the buffer into which the Summa Four stored
                   the string), and the second is the number of digits
                   collected. If the non-enhanced report is used, the
                   administrator's database must disable reporting of the
                   field designator. */
              // if the $d1 segment is in the "enhanced" format . . .
              if (s4evt->u.inpulse_rule_complete.opt[ct].dtmf_digit.enhanced)
              {
                   // store-the field designator:
                   s4evt->u.inpulse_rule_complete.opt[ct].
```

-continued

```
                    dtmf_digit.field_designator = buf[byte++];
            // store the number of digits in the digit string:
            s4evt->u.inpulse_rule_complete.opt[ct].
                    dtmf_digit.num_digits = buf[byte++];
    }       // close if the $d1 segment is in "enhanced" format.
    /*      next follows the digit string, two digits per byte,
            terminated with an F.
            a hex value of 0x0a equals 0;
            a hex value of 0x0b equals *;
            a hex value of 0x0c equals #;
            actually, digit string formatting depends on whether
            we're receiving a standard or enhanced version of the
            report. */
    // if there are digits included in the optional $d1 segment . . .
    if (s4evt->u.inpulse_rule_complete.opt[ct].dtmf_digit.got_digits)
    {
            memset(s4evt->u.inpulse_rule_complete.
                                    opt[ct].dtmf_digit.digits,'\0',sizeof(s4evt->u.
                                    inpulse_rule_complete.opt[ct].dtmf_digit.digits));
            {
            uint8   i;                  /* counter */
            i = 0;
                            /* this while loop stores the numerically represented
                                    telephone digits in the summa report as
                                    numerically represented digits in
                                    s4evt->u.inpulse_rule_complete.opt[ct].
                                    dtmf_digit_digits[i]. note that no
                                    conversion from number to char
                                    is done here. */
                    while (1)
                    {
                                    if (BITRANGE(buf[byte],8,4) == 0xf)
                                    {
                                            s4evt->u.inpulse_rule_complete.opt[ct].
                                                    dtmf_digit.digits[i] = buf[byte];
                                            byte++;
                                            i++;
                                            break;
                                    }
                                    if (BITRANGE(buf[byte],4,4) == 0xf)
                                    {
                                            s4evt->u.inpulse_rule_complete.opt[ct].
                                                    dtmf_digit.digits[i] = buf[byte];
                                            byte++;
                                            i++;
                                            break;
                                    }
                                    else
                                    {
                                            s4evt->u.inpulse_rule_complete.opt[ct].
                                                    dtmf_digit.digits[i] = buf[byte];
                                            i++;
                                            byte++;
                                    }
                            }           /* close white(1) */
            }
    }       /* close if got_digits */
    break;  // close if there is an optional $d1 segment attached.
// . . . and if the optional segment is a report of mf digits . . .
case S4_RPT_MF_DIGIT:
    /* next four bytes are mf receiver address. */
    s4evt->u.inpulse_rule_complete.opt[ct].mf_digit.recaddr =
            UINT32 (buf[byte+3], buf[byte+2], buf[byte+1], buf[byte]);
    buf += 4;
    /*
            next byte is the MF status byte, defined as follows:
                    VS000XYZ
            V: set to 1 if report was garbled
            S: collection error bit
                    if V or Y is set to 1,
                                    0 -> control port forced idle
                                    1 -> control port put in CP_SETUP state
                    if V and Y are both 0, no meaning.
            X: specified if MF receiver was available: 1 = yes, 0 = no.
            Y: 1 if MF digit collection timed out, else 0.
            Z: set to 1 if a digit string follows, else 0.
    */
    s4evt->u.inpulse_rule_complete.opt[ct].mf_digit.
            report_garbled = BIT (buf[byte], 8);
```

```
                s4evt->u.inpulse_rule_complete.opt[ct].mf_digit.
                        timeout = BIT (buf[byte], 2);
        if (s4evt->u.inpulse_rule_complete.opt[ct].mf_digit.
                        report_garbled ||
                        s4evt->u.inpulse_rule_complete.opt[ct].mf_digit.
                        timeout)
        {
            if (BIT (buf[byte], 7))
            {
                s4evt->u.inpulse_rule_complete.opt[ct].mf_digit.
                        forced_idle = 0;
                s4evt->u.inpulse_rule_complete.opt[ct].mf_digit.
                        setup_state = 1;
            }
            else
            {
                s4evt->u.inpulse_rule_complete.opt[ct].mf_digit.
                        forced_idle = 1;
                s4evt->u.inpulse_rule_complete.opt[ct].mf_digit.
                        setup_state = 0;
            }
        }
        else
        {
            s4evt->u.inpulse_rule_complete.opt[ct].mf_digit.
                    forced_idle = 0;
            s4evt->u.inpulse_rule_complete.opt[ct].mf_digit.
                    setup_state = 0;
        }
        s4evt->u.inpulse_rule_complete.opt[ct].mf_digit.
                receiver_available = BIT (buf[byte], 3);
        s4evt->u.inpulse_rule_complete.opt[ct].mf_digit.
                got_digits = BIT (buf[byte], 1);
        ++byte;
        s4evt->u.inpulse_rule_complete.opt[ct].mf_digit.digits[0] = '\0';
        /*
            there is an optional bit that is sent if the administrator
            database says to enable digit field reporting. this
            function is not expecting that extra byte, and therefore
            errors will occur if it is there. next follows the digit
            string, two digits per byte, terminated with an F.
        */
        // if there are digits included in the optional $d0 segment . . .
        if (s4evt->u.inpulse_rule_complete.opt[ct].mf_digit.got_digits)
        {
            // debugging:
            log_write (0,9,"inside s4com and unpacking mf digits.");
            memset(s4evt->u.inpulse_rule_complete.
                    opt[ct].mf_digit.digits,'\0',sizeof(s4evt->u.
                    inpulse_rule_complete.opt[ct].mf_digit.digits));
            {
            uint8       i;          // counter
            i = 0;
                        /* this while loop stores the numerically represented
                                telephone digits in the summa report as
                                numerically represented digits in
                                s4evt->u.inpulse_rule_complete.opt[ct].
                                mf_digit_digits[i]. note that no
                                conversion from number to char
                                is done here. */
                        while (1)
                        {
                            if (BITRANGE(buf[byte],8,4) == 0xf)
                            {
                                s4evt->u.inpulse_rule_complete.opt[ct].
                                        mf_digit.digits[i] = buf[byte];
                                                        byte++;
                                                        i++;
                                                        break;
                            }
                            if (BITRANGE(buf[byte],4,4) == 0xf)
                            {
                                s4evt->u.inpulse_rule_complete.opt[ct].
                                        mf_digit.digits[i] = buf[byte];
                                byte++;
                                i++;
                                break;
                            }
                            else
```

-continued

```
                {
                    s4evt->u.inpulse_rule_complete.opt[ct].
                    mf_digit.digits[i] = buf[byte];
                    i++;
                    byte++;
                }
            } // close while(1)
        } // close local block with counter variable.
    } // close if got_digits in mf.
    // debugging:
    log_write (0,9,"In s4com and done unpacking mf digits.");
    // old ryder code here;
    // use the mf code above to make sure that the numeric
    // digits sent by the summa remain as numbers and are not
    // converted into characters.
    // the function s4_convert_digits will do the conversion later.
    /* if (s4evt->u.inpulse_rule_complete.opt[ct].mf_digit.got_digits)
    {
        while (! return_flag)
        {
            for (ct = 0; ct < 2; ct++) {
                if (return_flag) {
                    break;
                }
                val = BITRANGE (but[byte], 8 - (4 * (ct % 2)), 4);
                switch (val) {
                    case 0x0a:
                        strcat (s4evt->u.inpulse_rule_complete.opt[ct].mf_digit.digits, "0");
                        break;
                    case 0x0f:
                        return_flag = 1;
                        break;
                    default:
                        if (val <= 0x09) {
                            sprintf (s4evt->u.inpulse_rule_complete.opt[ct].mf_digit.digits + strien (s4evt->u.inpulse_rule_complete.opt[ct].mf_digit.digits), "%d", val);
                        } else {
                            log_write (0, 1, "ERROR: invalid digits").
                            return (-1);
                        }
                        break;
                }
            }
            ++byte;
        }
    }*/
    break;
    // ... but if the optional segment is not an incoming port change
    // of state, nor a dtmf report, nor an mf report,
    // then something is wrong:
    default:
        log_write (0,9,"ERROR: inpulse rule complete contains invalid optional segment.");
        return (-1);
        break;
    } // close look at the function id of the optional segment.
} // close for every optional segment attached to this report.
break;
/* name:     s4_call_process.
   context:  who knows which functions call s4_call_process.
             HOWEVER, when an EVENT either comes from the summa
             (and must be passed on to the core),
             OR comes from the core
             (and must be passed on to the summa),
             then s4_call_process receives that EVENT,
             and decides what, if anything, to do with it.
             this is the central function and entry point to s4proc.c
   action:   make sure a valid EVENT and PROCESS have been passed in;
             then transfer the flow to another function,
             based on the source of the EVENT.
   returns:  0 on success; -1 on failure.
   notes:    ret_evtdata is not used.
             ret_evtdata should be removed eventually. */
_call_process(EVENT *evtdata, PROCESS *process)
    // make sure process is nonnull:
    if (process == NULL) {
        log_write (0,9,"ERROR: NULL process in s4_call_process.");
```

```
            return (-1);
    }
    // make sure evtdata is nonnull:
    if (evtdata == NULL) {
        log_write (0,9,"ERROR: NULL event in s4_call_process.");
        return (-1);
    }
    // blank line makes switchint.log MUCH easier to read;
    // this way you can visually see each time a new EVENT is handled:
    /*
    log_write (0,9,"");
    */
    // transfer flow based on the event source:
    switch (evtdata->source) {
        case EV_PROC:
            s4_event_source_ev_proc (evtdata,process);
            break;
        case EV_S4:
            s4_event_source_ev_s4 (evtdata,process);
            break;
        case EV_TIMER:
            s4_event_source_ev_timer (evtdata,process);
            break;
        case EV_SWITCH:
            s4_event_source_ev_switch (evtdata, process);
            break;
        case EV_SS7INT:
            s4_event_source_ev_ss7int (evtdata,process);
            break;
        // evtdata's source should be one of the above:
        default:
            log_write (0,9,"ERROR: unknown event source in s4_call_process.");
            break;
    }   // close switch on evtdata's source.
    // return zero on success:
    return (0);
    // close s4_call_process
name:           s4_event_source_ev_s4.
    context:  the summa generates a report or an acknowledgement
                        and shoves it into a socket.
                        s4_process_msg and s4_unpack_msg look at the socket
                        and shove the data into an EVENT.
                        s4_call_process receives the EVENT and notices that its source
                        is EV_S4.
                        s4_call_process passes the EVENT to s4_event_source_ev_s4.
    action:   transfer flow based on evtdata's type.
    returns:  0 on success; -1 on failure.
    notes:    as for s4_event_source_ev_switch, there should be no blank
                        case statements below.
                        rather, function stubs should be written to allow for
                        easier future implementation of currently unused message types. */
event_source_ev_s4 (const EVENT *evtdata, PROCESS *process)
    // the arguments to the case statements below are preprocessor defined in
    // s4com.h.
    // transfer control based on evtdata's type:
    switch (evtdata->type)
    {
        // $80 report:
        case S4_RPT_RESOURCE_ALLOC:
            log_write (0,9,"Inside S4_RPT_RESOURCE_ALLOC branch.");
            break;
        // $81 report:
        case S4_RPT_HARDWARE_ALLOC:
            log_write (0,9,"Inside the S4_RPT_HARDWARE_ALLOC branch.");
            break;
        // when a span dies, we'll use this report to update the porttable;
        // the $f0 report (alarm status) doesn't contain port numbers.
        // $82 report:
        case S4_RPT_CARD_STATUS:
            s4_rpt_system_card_status (evtdata,process);
            break;
        // $83 report:
        case S4_RPT_PORT_STATUS:
            log_write (0,9,"Inside the S4_RPT_PORT_STATUS branch.");
            break;
        // $d0 report:
        case S4_RPT_MF_DIGIT:
            log_write (0,9,"inside the S4_RPT_MF_DIGIT branch.");
            break;
```

-continued

```
// $d1 report:
case S4_RPT_DTMF_DIGIT:
    s4_rpt_dtmf_digit (evtdata,process);
    break;
// $d2 report:
case S4_RPT_PERMANENT_SIGNAL_CONDITION:
    log_write (0,9,"Inside the S4_RPT_PERMANENT_SIGNAL_COND branch.");
    break;
// $d3 report:
case S4_RPT_SYSTEM_PORT_STATUS:
    s4_rpt_system_port_status (evtdata,process);
    break;
// $d5 report:
case S4_RPT_ROUTING_ACTION:
    log_write (0,9,"Inside the S4_RPT_ROUTING_ACTION branch.");
    log_write (0,9,"ERROR: routing action report should never be        "
        "generated unless telerouter is configured to the summa network.");
    break;
// $d6 report:
case S4_RPT_RESOURCE_LIMITATION:
    log_write (0,9,"Inside the S4_RPT_RESOURCE_LIMITATION branch.");
    break;
// $d9 report:
case S4_RPT_SYSTEM_CARD_STATUS:
    s4_rpt_system_card_status (evtdata,process);
    break;
// $da report:
case S4_RPT_OPORT_CHANGE_STATE:
    s4_rpt_oport_change_state (evtdata,process);
    break;
// $db report:
case S4_RPT_IPORT_CHANGE_STATE:
    s4_rpt_iport_change_state (evtdata,process);
    break;
// $dc report:
case S4_RPT_ACTIVE_OR_STANDBY_MODE:
    log_write (0,9,"Inside the S4_RPT_ACTIVE_OR_STNDBY_MODE branch.");
    /* informs host of a system boot, system initialization, or
        transfer in control between the active and standby sides
        of a redundant system. don't think there's an sws function
        to convey such info to the core. */
    break;
// $dd report:
case S4_RPT_INPULSE_RULE_COMPLETE:
    s4_rpt_inpulse_rule_complete (evtdata,process);
    break;
// $de report:
case S4_RPT_VOICE_PORT_STATUS:
    s4_rpt_voice_port_status (evtdata,process):
    break;
// $ea report:
case S4_RPT_ISDN_PORT_CHANGE_STATE:
    s4_rpt_isdn_port_change_state (evtdata,process);
    break;
// $ed report:
case S4_RPT_ISDN_INPULSE_RULE_COMPLETE:
    s4_rpt_isdn_inpulse_rule_complete (evtdata,process);
    break;
// a big function exists for this report, but so far we
// haven't implemented any responses to $f0 alarms.
// report $f0:
case S4_RPT_ALARM_CONDITION:
    s4_rpt_alarm_condition (evtdata,process);
    break;
// the summa generates both "reports" and "acknowledgements".
// reports tell us something new (for example, that a new call
// has arrived).
// acknowledgements acknowledge a command that we just sent.
// we don't handle acknowledgements that come from the switch;
    // so when we get an EVENT whose type is one of the following,
// we do nothing:
case S4_ACK_ISDN_PORT_CONTROL:
case S4_ACK_SUBRATE_PATH_CONTROL:
case S4_ACK_VOICE_PATH_CONTROL:
case S4_ACK_DTMF_COLLECTION_CONTROL:
case S4_ACK_MF_COLLECTION_CONTROL:
case S4_ACK_OUTGOING_PORT_CONTROL:
case S4_ACK_INCOMING_PORT_CONTROL:
case S4_ACK_CHANGE_INCOMING_PORT:
```

```
            case S4_ACK_VOICE_PORT_CONTROL:
            case S4_ACK_CONFERENCE_CONTROL:
            case S4_ACK_PORT_HOOK_STATE_CONTROL:
            case S4_ACK_PORT_SUPERVISION_CONTROL:
            case S4_ACK_CHANGE_PORT_STATUS:
            case S4_ACK_VOICE_PROMPT_MAINTENANCE_CONTROL:
            case S4_ACK_SET_SYSTEM_CLOCK:
            case S4_ACK_CHANGE_ACTIVE_CONTROLLERS:
            case S4_ACK_T1_SYNCHRONIZATION_CONTROL:
            case S4_ACK_SET_HOST_ALARMS:
            case S4_ACK_HOST_CALL_LOAD_CONTROL:
            case S4_ACK_ASSUME_PORT_CONTROL:
            case S4_ACK_RELINQUISH_PORT_CONTROL:
                break;
            // the summa should generate EVENTs with types only like those
            // above. if not, there's a problem:
            default:
                log_write (0,9,"ERROR: invalid type in s4_event_source_ev_s4.");
                log_write (0,9,"ERROR: type is %d.",evtdata->type);
                return (-1);
                break;
        }
        // return zero on success:
        return (0):
}   // close s4_event_source_ev_s4.
/*  name:       s4_rpt_inpulse_rule_complete.
    context:    the summa completes execution of an inpulse rule.
                        the summa generates a $dd report to let the host know.
                        s4_process_msg receives the report.
                        s4_unpack_msg puts the report into an S4_EVTDATA struct.
                        that S4_EVTDATA is tacked on to an EVENT.
                        the EVENT passed to s4_call_process.
                        s4_call_process passes the EVENT to s4_event_source_ev_s4.
                        s4_event_source_ev_s4 passes the EVENT to s4_rpt_inpulse_rule_complete.
    action:     examines evtdata and the S4_EVTDATA s4evt, that comes with.
                        usually, the completion of an inpulse rule indicates the presence of a new call.
                        so information is extracted from s4evt.
                        that information is passed to the core with sws_new_call.
    returns;    0 on success; -1 on failure. */
int
s4_rpt_inpulse_rule_complete (const EVENT *evtdata,PROCESS *process)
{
    S4_EVTDATA   *s4evt       = NULL;       // dataholder for $dd report.
    SW_SESS      *sess                    = NULL;      // profileholder for telephone call.
    SW_SESS      *imt_sess = NULL;    // profileholder for telephone-call-w/-imt.
    SW_SWITCH    *sw          = NULL;       // profileholder for telephone switch.
    EV_SOURCE    *s                        = NULL;       // profileholder for source of EVENT.
    PT_PORT      *chan1       = NULL;       // profileholder for port with telephone call.
    PT_PORT      *imt_chan = NULL;    // profileholder for intermachine trunkgroup.
    PT_TRUNK        *trunk    = NULL;       // profileholder for trunk group with telephone call.
    uint8    num_optional_segments;        // 0 to 5.
    uint8    num_opt_segs_with_dtmf;       // num of opt dtmf segments attached.
    uint8    num_opt_segs_with_mf;         // num of opt mf segments attached.
    uint8    num_opt_segs_with_ipcs;       // num of opt incoming port state segs attached.
    char     ani_field[27]    = "";               // digits, if any, in ani field.
    char     dnis_field[27]   = "";        // digits, if any, in ip field 1.
    char     ip_field2[27]    = "";               // digits, if any, in ip field 2.
    char     ip_field3[27]    = "";               // digits, if any, in ip field 3.
    uint8    num_dtmf_vars_assigned;       // how many of the four variables above have been given values. used as a
counter.
    uint8    num_mf_vars_assigned;         // how many of the four variables above have been given values.
    int      ret                          = 0;          // return value holder.
    uint8    i                            = 0;     // counter.
    // welcome message:
    // log_write (0,9,"Inside s4_rpt_inpulse_rule_complete.");
    // profile source from which the evtdata came:
    s = ev_get_source_info (process->srcid);
    if (s == NULL) {
        log_write (0,9,"ERROR: couldn't get source.");
        return (-1);
    }
    // profile switch which generated s4evt:
    sw= sw_get_switch (s->id);
    if (sw == NULL) {
        log_write (0,9,"ERROR: couldn't get switch.");
        return (-1):
    }
    // retrieve data attached to evtdata:
    s4evt = (S4_EVTDATA*) evtdata->data;
```

-continued

```
if (s4evt == NULL) {
    log_write (0,9,"ERROR: no data attached to evtdata.");
    return (−1);
}
// log the inpulse rule number that just completed.
// if the inpulse rule is rule 10,
// then we've just collected digits but DO NOT have a new call:
// log_write (0,9,"inpulse rule that just complete was number %d.",s4evt->u.inpulse_rule_complete.inpulse_rule);
// log_write (0,9,"number of optional segments included is %d.",s4evt->u.inpulse_rule_complete.segctl.num_segs);
// if the inpulse rule was 10, then we know there's exactly one $d1 report.
// we call a special function to handle situations just like this:
if (s4evt->u.inpulse_rule_complete.inpulse_rule == 10) {
    ret = s4_do_analyze_irule_digit_report (evtdata,process);
    if (ret < 0) {
        log_write (0,9,"ERROR: failed call to s4_do_analyze_irule_digit_report.");
        return (−1);
    }
}
// check to see if the inpulserule is a digitcollected inpulse rule.
// inpulserules 21 through 34 inclusive should be programmed on the
// switch to be digitcollected inpulserules:
switch (s4evt->u.inpulse_rule_complete.inpulse_rule) {
    case 21:
    case 22:
    case 23:
    case 24:
    case 25:
    case 26:
    case 27:
    case 28:
    case 29:
    case 30:
    case 31:
    case 32:
    case 33:
    case 34:
        // if the inpulserule indicates digits collected,
        // then call a function to analyze those digits:
        ret = s4_do_analyze_irule_digit_report (evtdata,process);
        if (ret < 0) {
            log_write (0,9,"ERROR: failed call to s4_do_analyze_irule_digit_report.");
            return (−1);
        }
        // don't fall through to handle new call code:
        return (0);
        break;
    // if not one of the digitcollected inpulserules, then fall through
    // and let the subsequent code handle 5 new call:
    default:
        break;
}     // close check to see if it was a digitcollected inpulserule.
// find number of optional segments attached:
num_optional_segments = s4evt->u.inpulse_rule_complete.segctl.num_segs;
// log_write (0,9,"%d optional segs.",num_optional_segments);
// find how many of each type of opt segment are attached.
// only possibilities are $db, $d0, $d1
// $d0: reports that mf digits were collected;
// $d1: reports that dtmf digits were collected;
// $db: reports that an incoming port had a change of state.
// intialize $d1, $d0 and $db counters to zero:
num_opt_segs_with_dtmf    = 0;
num_opt_segs_with_mf      = 0;
num_opt_segs_with_ipcs    = 0;
// for each optional segment attached . . .
for (i=0; i<num_optional_segments; i++) {
    // look at the optional segment type (function id) . . .
    switch (s4evt->u.inpulse_rule_complete.opt[i].function_id)
    {
        // and increment either the $d1, $d0 or $db counter . . .
        case (0xd1):
            num_opt_segs_with_dtmf++;
            break;
        case (0xd0):
            num_opt_segs_with_mf++;
            break;
        case (0xdb):
            num_opt_segs_with_ipcs++;
            break;
        // . . . BUT if the message type is not $d1, $d0 or $db, there's a problem:
```

```
                default:
                    log_write (0,9,"ERROR: An INPULSE_RULE_COMPLETE report showed up with an unknown type of message embedded.");
                    return (-1);
                    break;
            }   // close look at the optional segment type.
    }   // close for each of the optional segments attached.
    // debugging:
    // log_write (0,9,"Number of dtmf segments attached is %d.",num_opt_segs_with_dtmf);
    //   log_write (0,9,"Number of mf segments attached is %d.",num_opt_segs_with_mf);
    //   log_write (0,9,"Number of incomingport-change-state segs attached is %d.",num_opt_segs_with_ipcs);
    //   the four variables ani_field, dnis_field, ip_field2 and ip_field3 are used
    //   to hold dtmf OR mf digits.
    //   we can call these variables "dtmf variables" (or "mf variables").
    //   the counter num_dtmf_vars_assigned tracks how many of these dtmf variables
    //   have so far been assigned values.
    //   num_mf_vars_assigned does the same for mf variables.
    //   initially, no dtmf variables or mf variables have been assigned values:
    num_dtmf_vars_assigned       = 0;
    num_mf_vars_assigned         = 0;
    //      for each optional segment attached . . .
    for (i=0; i<num_optional_segments; i++) {
        // look and see if the segment contains *DTMF* digits. if so . . .
        if (s4evt->u.inpulse_rule_complete.opt[i].function_id == 0xd1) {
            // find how many dtmf variables have so far been assigned values:
            switch (num_dtmf_vars_assigned) {
                // if no dtmf vars have been assigned . . .
                case 0:
                    // stick this first dtmf string into dnis_field:
                    ret = s4_convert_digits (s4evt->u.inpulse_rule_complete.opt[i].dtmf_digit.digits,dnis_field):
                    if (ret < 0) {
                        log_write (0,9,"ERROR: failed call to s4_convert_digits.");
                        return (-1);
                    }
                    // log_write (0,9,"stuck dtmf digits into dnis field.");
                    break;
                // if one dtmf var has been assigned . . .
                case 1:
                    // then stick this second dtmf string into ani_field:
                    ret = s4_convert_digits (s4evt->u.inpulse_rule_complete.opt[i].dtmf_digit.digits,ani_field);
                    if (ret < 0) {
                        log_write (0,9,"ERROR: failed call to s4_convert_digits.");
                        return (-1);
                    }
                    // log_write (0,9,"stuck dtmf digits into the ani field.");
                    break;
                // if two dtmf vars have been assigned . . .
                case 2:
                    // then stick this third dtmf string into ip_field2:
                    ret = s4_convert_digits (s4evt->u.inpulse_rule_complete.opt[i]dtmf_digit.digits,ip_field 2);
                    if (ret < 0) {
                        log_write (0,9,"ERROR: failed call to s4_convert_digits.");
                        return (-1):
                    }
                    // log_write (0,9,"stuck dtmf digits into ip field 1.");
                    break;
                // if three dtmf vars have been assigned . . .
                case 3:
                    // then stick this fourth dtmf string into ip_field3:
                    ret = s4_convert_digits (s4evt->u.inpulse_rule_complete.opt[i].dtmf_digit.digits,ip_field3);
                    if (ret < 0) {
                        log_write (0,9,"ERROR: failed call to s4_convert_digits.");
                        return (-1);
                    }
                    // log_write (0,9,"stuck dtmf digits into ip field 2.");
                    break;
                // if more than four dtmf strings are included with the $dd report, then there's a problem.
                // we have no way to send more than 4 dtmf strings to the core with
                // the sws_new_call function, and it just doesn't seem reasonable
                // that the summa would send that many dtmf strings:
                default:
                    // error out:
                    log_write (0,9,"ERROR: more than 4 dtmf strings have been included in a $dd report for session %d.",sess->sess_id);
                    return (-1);
                    break;
            }   // close find how many dtmf variables have already been assigned.
            // note that one more dtmf variable just got assigned a value:
            num_dtmf_vars_assigned++;
        }   // close look to see whether the segment is a dtmf digit segment.
        // look and see if the segment contains *MF* digits. if so . . .
```

-continued

```
                if (s4evt->u.inpulse_rule_complete.opt[i].function_id == 0xd0) {
                    // find how many dtmf variables have so far been assigned values:
                    switch (num_mf_vars_assigned) {
                        // if no mf vars have been assigned . . .
                        case 0:
                            // stick this first mf string into dnis_field:
                            ret = s4_convert_digits (s4evt->u.inpulse_rule_complete.opt[i].mf_digit.digits,dnis_field);
                            if (ret < 0) {
                                log_write (0,9,"ERROR: failed call to s4_convert_digits.");
                                return (-1);
                            }
                            // log_write (0,9,"stuck mf digits into dnis field.");
                            break;
                        // if one mf var has been assigned . . .
                        case 1:
                            // then stick this second dtmf string into ani_field:
                            ret = s4_convert_digits (s4evt->u.inpulse_rule_complete.opt[i].mf_digit.digits,ani_field);
                            if (ret < 0) {
                                log_write (0,9,"ERROR: failed call to s4_convert_digits.");
                                return (-1);
                            }
                            // log_write (0,9,"stuck mf digits into ani field.");
                            break;
                        // if two mf vars have been assigned . . .
                        case 2:
                            // then stick this third dtmf string into ip_field2:
                            ret = s4_convert_digits (s4evt->u.inpulse_rule_complete.opt[i].mf_digit.digits,ip_field2);
                            if (ret < 0) {
                                log_write(0,9,"ERROR: failed call to s4_convert_digits.");
                                return (-1);
                            }
                            // log_write (0,9,"stuck mf digits into ip field 1.");
                            break;
                        // if three mf vars have been assigned . . .
                        case 3:
                            // then stick this fourth dtmf string into ip_field3:
                            ret = s4_convert_digits (s4evt->u.inpulse_rule_complete.opt[i].mf_digit.digits,ip_field3);
                            if (ret < 0) {
                                log_write (0,9,"ERROR: failed call to s4_convert_digits.");
                                return (-1);
                            }
                            // log_write (0,9,"stuck mf digits into ip field 2.");
                            break;
                        // if more than four mf strings are included with the $dd report, then there's a problem.
                        // we have no way to send more than 4 mf strings to the core with
                        // the sws_new_call function, and it just doesn't seem reasonable
                        // that the summa would send that many mf strings:
                        default:
                            // error out:
                            log_write (0,9,"ERROR: more than 4 mf strings have been included in a $dd report for session %d.", sess->sess_id);
                            return (-1);
                            break;
                    }   // close find how many mf variables have already been assigned.
                    // note that one more mf variable just got assigned a value:
                    num_mf_vars_assigned++;
                }   // close look to see whether the segment is a mf digit segment.
        }   // close for each optional segment attached.
        /// triple slashes like this mean that these are debugging messages that
        /// have outlived their usefulness and now just clutter up the log files.
        /// BUT they should not be removed bc they might be useful later.
        /// log_write (0,9,"Info: %d opt segs with mf digits.",num_opt_segs_with_mf);
        /// log_write (0,9,"Info: %d opt segs with dtmf digits.",num_opt_segs_with_dtmf);
        /// log_write (0,9,"Info: %d opt segs with ipcss.",num_opt_segs_with_ipcs);
        // debugging:
        // log_write (0,9,"we have left the digit filling portion of s4_rpt_inpulse_rule_complete.");
        // profile incoming port to telephone call:
        chan1 = pt_get_port_address (sw->id,s4evt->u.inpulse_rule_complete.cport);
        it (chan1 == NULL) {
            log_write (0,9,"ERROR: failed call to pt_get_port_address.");
            return (-1);
        }
        // profile trunkgroup containing incoming port of telephone call:
        trunk = pt_get_trunk (chan1->switch_id, chan1->group);
        if (trunk == NULL) {
            log_write (0,9,"ERROR: couldn't get trunk group of new call.");
            return (-1);
        }
        // an inpulse rule completing (usually) means a new telephone call.
        // create a new session to profile the new telephone call:
```

```
            sess = sw_new_sess (sw->id);
            if (sess == NULL) {
                log_write (0,9,"ERROR: failed call to sw_new_sess.");
                return (-1);
            }
            // incoming port receives same the session id:
            chan1->sess_id = sess->sess_id;
            // if an INPULSE_RULE_COMPLETE report also tells you that
            //   a port has changed states (ie, a $db report is embedded
            //   in the $dd report currently being acted upon), then
            //   it is the responsibility of this function to update the
            //   porttable with the information contained in that $db.
            //   this is done with a call to pt_port_parked,
            //   pt_port_idled, pt_port_inseized, etc.
            //   there are about 8 of those port status indication functions;
            //   all in porttable.c. search there.
            // we assume that the incoming port is currently parked:
            ret = pt_port_parked (chan1);
            if (ret < 0) {
                log_write (0,9,"ERROR: failed call to pt_port_parked.");
                return (-1);
            }
            /* call s_port_active */
            ret = s_port_active (sess,chan1);
            if (ret < 0) {
                log_write (0,9,"ERROR: failed call to s_port_active.");
                return (-1);
            }
            // if there are no imts connected to the tg of the incoming port . . .
            if (! trunk->assoc_imt_switch) {
                // find available path to talk to arbitrator.
                // arbitrator is always notified of every new call.
                // this* figures out where the arbitrator is so that
                //    the arbitrator can know about the new call.
                //    in order for the call to sws_new_call (below) to
                //    work, we must call sw_attach_arbit first.
                ret = sw_attach_arbit (sw,sess);
                if (ret < 0) {
                    log_write (0,9,"ERROR: can't attach to arbitrator.");
                    return (-1);
                }
                // notify core of new call.
                // you only make a call to sws_new_call after you've
                //    made a call to sw_new_sess.
                // for one thing, sws_new_call requires that a sess_id be passed to it.
                // you obtain a new sess_id from sw_new_sess.
                //    sws_new_call lets the core know about the SW_SESS created
                //    in the call to sw_new_sess.
                ret = sws_new_call (sess,chan1->group,chan1->member,ani_field,dnis_field,ip_field2,ip_field3,0,0);
                if (ret < 0) {
                    log_write (0,9,"ERROR: failed call to sws_new_call.");
                    return (-1);
                }
            }   // close if there are no imts connected.
            // else, if there *are* imts connected to the tg of the incoming port . . .
            else {
                imt_chan = pt_get_trunk_member (trunk->assoc_imt_switch,trunk->assoc_imt_group, chan1->member);
                if (imt_chan == NULL) {
                    log_write (0,0,"ERROR; couldn't get associated IMT group");
                    return (-1);
                }
                imt_sess = s_get_sess (imt_chan->switch_id, imt_chan->sess_id);
                if (imt_sess == NULL) {
                    /* Don't do anything here; the Nortel code, which is the only switch
                        for which this is a problem, will send an IMT complete when
                        the route selected comes back from the switch. */
                    return (-1);
                }
                sess->addr = imt_sess->addr;
                ret = sws_imt_complete (sess, chan1->group, chan1->member, ani_field,
                                        dnis_field, ip_field2, ip_field3, 0, 0,
                                        imt_sess, imt_chan->group, imt_chan->member);
            }   // close else if there *are* imts.
            // return zero on success:
            return (0);
}   // close s4_rpt_inpulse_rule_complete.
/*  name:               sws_new_call
    description:    pass this* info about a new call and this* will inform
                            the core of the fact.
```

```
        "sess":         SESSION associated with the incoming call.
        "group":        trunk group of the port on which the call is found.
        "member":       trunk group member of the port on which the call is found.
        "ani":          ANI of the call.
        "dnis":         DNIS of the call.
        "other1":       string that can be used for whatever.
        "other2":       ditto.
        "access_type":  leftover argument. no longer used.
        "call_type": ditto. you can safely pass zero for these arguments.
*/
int
sws_new_call (SW_SESS *sess, int group, int member, char *ani, char *dnis,
                        char*other1, char*other2, uint8 access_type, uint8 call_type)
{
    int ret;
    int byte = 0;
    int count;
    uint8 buf[SW_BUFSIZE];
    log_mesg ("NEW CALL - Switch ID = %lu, Session ID = %lu", sess->switch_id,
                        sess->sess_id);
    buf[byte++] = BYTE2(sess->switch_id);
    buf[byte++] = BYTE1(sess->switch_id);
    buf[byte++] = BYTE4(sess->sess_id);
    buf[byte++] = BYTE3(sess->sess_id);
    buf[byte++] = BYTE2(sess->sess_id);
    buf[byte++] = BYTE1(sess->sess_id);
    buf[byte++] = BYTE2(group);
    buf[byte++] = BYTE1(group);
    buf[byte++] = BYTE2(member);
    buf[byte++] = BYTE1(member);
    if (ani != NULL) {
        buf[byte++] = strlen (ani);
        for (count = 0; count < strlen (ani); count++) {
                buf[byte++] = ani[count]-'0';
        }
    }
    else {
        buf[byte++] = 0;
    }
    if (dnis != NULL) {
        buf[byte++] = strlen (dnis);
        for (count = 0; count < strlen (dnis); count++) {
            buf[byte++] = dnis[count]-'0';
        }
    }
    else {
        buf[byte++] = 0;
    }
    if (other1 != NULL) {
        buf[byte++] = strlen (other1);
        for (count = 0; count < strlen (other1); count++) {
            buf[byte++] = other1[count]-'0';
        }
    }
    else {
        buf[byte++] = 0;
    }
    it (other2 != NULL) {
        buf[byte++] = strlen (other2);
        for (count = 0; count < strlen (other2); count++) {
            buf[byte++] = other2[count]-'0';
        }
    }
    else {
        buf[byte++] = 0;
    }
    buf[byte++] = BYTE1(access_type);
    buf[byte++] = BYTE1(call_type);
    ret = sws_send_event (sess, SW_E_NEW_CALL, buf, byte);
    return (ret);
}
```

Now, with continued reference to FIG. 8A and, in particular, at step S8-7, the interfacing facility routes and/or sends the generated internal message to a task facility such as one that may perform billing processes, call routing processes, call processes. Processing and operations continue at the top of FIG. 8B. The nature of such internal processes are not limited in any way by the present invention. In fact, any form of internal, subordinate, tandem, or collateral task (internal or external) may be carried out once a message from a telecommunications device is translated and/or otherwise deciphered in accordance with the present invention.

Next, at step S8-8, interfacing facility 118 may convert the internal message to another external message type which may then routed to a second telecommunications device for appropriate processing thereby.

Next, at step S8-9, a determination will be made as to whether or not a new external message has been generated. That is, a determination will be made as to whether or not an external message was generated to carry out a particular call processing sequence of operations (e.g., continued call routing and processing, etc.). It is absolutely possible within the context of the present invention that a device specific message may be translated into an internal message which may then be processed solely and completely be an internal process (e.g., IVRU billing, etc.) without ever directing a second or supplementary telecommunications device. Accordingly, the present invention should not be interpreted to require the generation of a second external message which may be sent to a particular secondary telecommunications device for appropriate processing.

If a determination made at step S8-9 is negative, processing ends at step S8-11. Otherwise, if the determination made at step S8-9 is affirmative, processing proceeds to step S8-10.

At step S8-10, interfacing facility such as interfacing facility 118 will send a new external message generated in accordance with the present invention to a second telecommunication device for appropriate processing thereby.

Thereafter, processing ends at step S8-11.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for communicating with and controlling disparate telecommunications devices in a telecommunications network, comprising;

a first telecommunications device configured to perform a first networking function and to communicate within a telecommunications network according to a first communications protocol;

an interactive voice response unit (IVRU) configured to perform a second networking function and to communicate within said telecommunications network according to a second communications protocol, said second communications protocol defines a computer decipherable message structure having fields comprised of bit sequence; and an interfacing facility in communications with said first telecommunications device and said interactive voice response unit (IVRU) via said telecommunications network and configured to detect and receive a first external control message formatted in accordance with said first communications protocol from said first telecommunications device, to extract data from said first external control message, to generate an internal control message based on said data extracted from said first external control message, and to generate a second external control message based on said internal control message and said second communications protocol, and to send said second external control message to said interactive voice response unit (IVRU), whereby said interactive voice response unit (IVRU) is controlled to perform said second networking function in accordance with said second external control message.

2. The system according to claim 1, wherein said first telecommunications device is a switching facility configured to process a call within said telecommunications network, said first telecommunications protocol corresponding to said switching facility.

3. The system according to claim 1, wherein said interactive voice response unit (IVRU) is a voice response enabled switching facility.

4. A method for communicating with and controlling disparate telecommunications devices in a telecommunications network, comprising the steps of:

detecting and receiving a first external control message formatted in accordance with a first communications protocol corresponding to a first telecommunications device;

extracting data from said first external control message;

generating an internal control message based on said data extracted from said first external control message during said extracting step;

generating a second external control message based on said internal control message and a second communications protocol corresponding to an interactive voice response unit (IVRU), said second communications protocol defines a computer decipherable message structure having fields comprised of bit sequences; and sending said second external control message to said interactive voice response unit (IVRU) for control thereof to perform a telecommunications function based on said second external control message.

5. The method according to claim 4, wherein said first telecommunications device is a switching facility configured to process a call within said telecommunications network, said first telecommunications protocol corresponding to said switching facility.

6. The method according to claim 4, wherein said interactive voice response unit (IVRU) is a voice response enabled switching facility.

* * * * *